United States Patent
Kitano et al.

(10) Patent No.: US 6,902,752 B1
(45) Date of Patent: Jun. 7, 2005

(54) COATINGS FOR BAKERY/CONFECTIONERY USE AND PROCESS FOR PRODUCING THE SAME

(75) Inventors: Takahiro Kitano, Tsukuba-gun (JP); Kazutoshi Morikawa, Tsukuba-gun (JP); Koji Umeno, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 332 days.

(21) Appl. No.: 10/009,169

(22) PCT Filed: Jun. 7, 2000

(86) PCT No.: PCT/JP00/03708
§ 371 (c)(1),
(2), (4) Date: Dec. 7, 2001

(87) PCT Pub. No.: WO00/76328
PCT Pub. Date: Dec. 21, 2000

(30) Foreign Application Priority Data

Jun. 10, 1999 (JP) .......................................... 11/163176

(51) Int. Cl.$^7$ ................................................ A23P 1/08
(52) U.S. Cl. ........................... 426/96; 426/99; 426/289; 426/302; 426/307; 426/613; 426/659
(58) Field of Search ............................ 426/96, 99, 289, 426/302, 307, 659, 613, 98, 102, 555, 554, 285

(56) References Cited

U.S. PATENT DOCUMENTS

| 3,792,183 | A | * | 2/1974 | Lyall et al. ................. 426/307 |
| 3,959,498 | A | * | 5/1976 | Lyall et al. .................... 426/93 |
| 4,414,239 | A | * | 11/1983 | Oven ......................... 426/607 |
| 4,529,610 | A | * | 7/1985 | Blake et al. ................. 426/554 |
| 4,562,079 | A | * | 12/1985 | Herzing ....................... 426/94 |
| 4,585,657 | A | * | 4/1986 | Karwowski et al. ........ 426/285 |
| 4,777,056 | A | * | 10/1988 | Buhler et al. ............... 426/285 |
| 4,839,184 | A | * | 6/1989 | Cherukuri et al. .......... 426/307 |
| 4,910,031 | A | * | 3/1990 | Budd et al. .................... 426/96 |
| 5,153,013 | A | * | 10/1992 | Suyama et al. .............. 426/99 |
| 5,304,389 | A | | 4/1994 | Kondo et al. |
| 5,360,623 | A | * | 11/1994 | Thorson et al. ............. 426/555 |
| 5,571,555 | A | * | 11/1996 | Huang et al. ............... 426/659 |
| 6,287,616 | B1 | * | 9/2001 | Beeson et al. .............. 426/285 |

FOREIGN PATENT DOCUMENTS

JP 4-252142 9/1992

OTHER PUBLICATIONS

Swern, D. 1979. Bailey's Industrial Oil and Fat products, vol. 1. 4$^{th}$ edition. John Wiley & Sons, New York, p. 317,321, 326.*

Wainwright, R. "Cocoa Butter Alternative Fat Systems for Compound and Pastel Coating", The Manufacturing Confectioner (1986), vol. 66, No. 11, pp. 45–49.

Bigalli, G.L. "Practical Aspects of the Eutectic Effect on Confectionery Fats and Their Mixtures", The Manufacturing Confectioner (1998), vol. 68, No. 5, pp. 65–66, 68, 70 and 79–80.

* cited by examiner

*Primary Examiner*—Carolyn Paden
(74) *Attorney, Agent, or Firm*—Wenderoth, Lind & Ponack, L.L.P.

(57) ABSTRACT

Coatings for bakery/confectionery use and coated cakes or breads. These coatings have transparency like glaze, and appearance and crispiness like fondant, and suffer from neither stickiness nor sugar-sagging with the passage of time after coating. Coatings for bakery/confectionery use comprising fat and sugar as the main components and containing coarse grains of non-fat components having a grain size of 50 μm or more; and a process for producing a coating for bakery/confectionery use characterized by heating materials, which comprise fat and sugar as the main components and contain coarse grains of non-fat components having a grain size of 50 μm or more, to the melting temperature of the fat or above and solidifying the same substantially without pulverizing.

13 Claims, No Drawings

COATINGS FOR BAKERY/CONFECTIONERY USE AND PROCESS FOR PRODUCING THE SAME

This application is a 371 application of PCT/JP00/03708 filed Jun. 7, 2000.

TECHNICAL FIELD

The present invention relates to coating materials for the confectionery/bakery use and to coated confectioneries or bakeries.

BACKGROUND ART

There have been heretofore used a glaze as well as a fondant and a chocolate fondant as coating materials with an object to provide confectioneries and bakeries with sweetness. These materials are prepared by dissolving at least a large portion of a sugar in water and a liquor, and are coated on the confectioneries and bakeries to deposit the sugar afterward, where a uniform coating cannot be made unless the amount of water is quite strictly controlled.

In addition, the coated products, though not immediately after the production, absorb water from the confectionaries and bakeries or absorb the moisture from the atmosphere with the passage of tire to generate stickiness on a touch with the hand, which possibly results in an uncomfortable feeling at eating them. Also, there has been a problem that, in the case where the coated products are placed in a bag for take-out and storage, the sugar part sticks to the bag, thereby possibly resulting in an uncomfortable feeling also at the time of pulling out them.

DISCLOSURE OF THE INVENTION

During the course of a variety of investigations to obtain coating materials without having the above-mentioned defects, the present inventors had an idea of using an oily raw material that is substantially free of water, but it was recognized that, in the case where chocolate, which is an oily raw material that is substantially free of water, was used, an alien feeling was yielded without having a transparency like a glaze as well as an appearance and a coarse eating feeling of sugar like a fondant, thereby leading to the finding that the chocolate could not become a substitute.

In the course of further investigations, the present inventors have found that, by keeping the particle size of a solid component other than the oil and fat of chocolate greatly higher than that of chocolate, the appearance and the eating feeling can be made analogous to those of the glaze and the fondant, and in addition, the sticky property, which had been heretofore generated with the passage of time after the coating, can be significantly improved, thereby resulting in the completion of the present invention.

That is, the present invention is a coating material for the confectionery/bakery use comprising as main components an oil and fat and a sugar, which contains coarse particles of a solid component other than oil and fat having a particle size of 50 μm or more; a process for producing coating material for the confectionery/bakery use, which comprises heating raw materials comprising as main component an oil and fat and a sugar, which contain coarse particles of a solid component other than the oil and fat having a particle size of 50 μm or more, to above a temperature at which the oil and fat melt, and then solidifying the resulting mixture without substantial decrease of the particle size of the solid component other than oil and fat; as well as a process for producing coated confectionery or bakery product, which comprises heating a coating material for the confectionery/bakery use to heating above a temperature at which the oil and fat melt, coating the resulting material on a confectionery or bakery product and then solidifying the oil and fat component.

Best Mode for Carrying Out the Invention

The coating material for the confectionery/bakery use referred to in the present invention is composed of an oil and fat, and a sugar or a solid component other than oil and fat and sugar, where an oil and fat and a sugar can be mainly utilized. As for a solid component other than oil and fat and sugar, a milk product, a cacao mass, a cheese powder, a coffee powder, a fruit juice powder and the like can be utilized to give a variety of flavor to the coating materials for the confectionery/bakery use. The addition amount of the solid component other than oil and fat and sugar is preferably 20% by weight or less based on the total weight of the coating materials for the confectionery/bakery use.

It is preferred that the coating materials for the confectionery/bakery use referred to in the present invention comprise an oil and fat and a sugar as the main components and contain coarse particles of a solid component other than oil and fat having a particle size of 50 μm or more. It is preferred that the component having a particle size of 50 μm or less in the solid component other than oil and fat is in an amount of 20% by weight or less of the solid component other than oil and fat. When the lower limit is exceeded, the eating feeling becomes less crispy, and, in the case of comprising an oil and fat and a sugar, transparency is difficult to be shown, and a coated appearance like a glaze and a fondant is not yielded. Also, in the case where a solid component other than oil and fat and sugar is added, a flavoring effect consistent with the addition amount cannot be expected.

Examples of the oil and fat to be used for the coating materials for the confectionery/bakery use of the present invention may include, for example as the raw material, a vegetable oil and fat such as rapeseed oil, soybean oil, sunflower seed oil, cottonseed oil, peanut oil, rice bran oil, corn oil, safflower oil, olive oil, kapok oil, sesame oil, evening primrose oil, palm oil, shea butter, Saru butter, cacao butter, coconut butter, palm kernel oil or the like, and an animal oil and fat such as milk fat, beef tallow, lard, fish oil, whale oil or the like, as well as a modified oil and fat (having the melting point of about 10 to 40° C.) that is prepared by subjecting such an oil and fat to hydrogenation, fractionation, interesterification or the like.

In the case where a coating material for the confectionery/bakery use is coated on a dough, and the coated dough is stored at 5° C. or above, the content of a solid fat at 20° C. is preferably 45% or more, and the content of a solid fat at 35° C. is preferably 15% or less, on the basis of the total amount of the oil and fat in the coating material for the confectionery/bakery use. More preferably, the oil and fat in the coating material for the confectionery/bakery use contain 70% or more of a laurin oil and fat and 20% or less of a total of SU2 and U3, and the content of a solid fat therein is preferably 75 to 90% at 10° C., 70 to 85% at 20° C. and 15 to 35% at 30° C. As for the laurin oil and fat, there can be used coconut oil, palm kernel oil or a hardened oil such as a fractionated, high-melting portion of palm kernel oil or the like. The iodine value of each of the hydrogenated oil shall be 15 or less and preferably 10 or less. The melting point of such an oil and fat shall be 30 to 40° C., which is necessary for making the skeleton after solidification of the coating material for the confectionery/bakery use. As for the raw material containing SU2 and U3 (S refers to a saturated fatty acid and U refers to an unsaturated fatty acid), there can be used a vegetable oil and fat, which is collected from rapeseed, soybean, sunflower, safflower, palm or the like, then purified and modified (hydrogenation, fractionation, interesterification or the like). Such SU2 and U3 act to soften the coating material so as to be smoothly cut with a knife and to be not cracking, and also act to provide the coating material with a luster.

In the case where a coating material for the confectionery/bakery use is coated on a dough and the coated dough is stored at 5° C. or below, the melting point of the oil and fat is preferably about 10 to 30° C., and the content of a solid fat therein is preferably 35 to 75% at 10° C., 7 to 45% at 20° C. and 5% or less at 30° C. Hereupon, the content of a solid fat (SFC) can be determined according to the method of IUPAC 2.150 (Solid Content Determination in Fats by NMR).

The content of the oil and fat in the coating materials for the confectionery/bakery use is preferably 25 to 75% by weight. More preferably, it is made to be 28 to 50% by weight. When the content of the oil and fat exceeds 75% by weight to make the oil and fat too much and the sugar little, the sweetness and the eating feeling like a glaze and a fondant cannot be obtained. When the content of the oil and fat is 25% by weight or below to make the oil and fat too little and the sugar much, the coating materials for the confectionery/bakery use are not flowable even with heating, thereby being not able to be used for the purpose of coating like a glaze and a fondant.

The sugar to be used in the coating materials for the confectionery/bakery use of the present invention may be exemplified by cane sugar, malt sugar, grape sugar, powdered candy, fruit sugar, milk sugar, trehalose, powdered maltose or the like. The content of the sugar is preferably 25 to 75% by weight. More preferably, it is made to be 50 to 72% by weight. The sugar to be used herein preferably has a particle size of 50 $\mu$m or more and about 1 mm or less.

The solid component other than an oil and fat and a sugar to be used in the coating materials for the confectionery/bakery use of the present invention may be exemplified by a milk product such as a whole milk powder, a skim milk powder, a cream powder, a whey powder, a butter milk powder or the like, a cacao component such as a cacao mass, a cocoa powder, a modified cacao powder or the like, a cheese powder, a coffee powder, a fruit juice powder or the like. The solid component other than an oil and fat having a particle size of 50 $\mu$m or less shall be in an amount of 20% by weight or less, preferably 10% by weight or less, in the solid component other than an oil and fat. When the amount exceeds 20% by weight, the eating feeling of the coating materials for the confectionery/bakery use becomes less crispy, and, in the case of comprising an oil and fat and a sugar, transparency is difficult to be shown, and a coated appearance like a glaze and a fondant is not yielded. Also, in the case where a solid component other than oil and fat and sugar is added, a flavoring effect consistent with the addition amount cannot be expected further. Also, when said solid component having a particle size of 1 mm or more increases, the dispersibility of the sugar in the oil and fat is receded.

In the present invention, the water content based on the total weight of the coating material for the confectionery/bakery use is preferably 5% by weight or less. When the water content exceeds 5% by weight, the viscosity of the coating material becomes higher to make the coating operation difficult to perform.

As for the confectionery or bakery products to be coated with the coating material for the confectionery/bakery use, which are referred to in the present invention, the confectionery products include a frozen desert and a refrigerated confectionery, where the frozen desert may be specifically exemplified by ice cream, ice milk, lact milk, sherbet or the like. The refrigerated confectionery may be exemplified by a cake, a pudding, a jelly, Bavarian cream or the like. Also, the bakery products may be exemplified by a cream puff, a doughnut, a bread or the like.

The process for production of the coating materials for the confectionery/bakery use of the present invention may comprise melting to mix all of the raw materials at once, whereas the dispersibility is improved by adding a part of melted oil and fat afterward. As needed, a food color, an emulsifier and a flavor are added. The thus-obtained, pastry mixed dispersion contains coarse particles of the solid component other than oil and fat having a particle size of 50 $\mu$m or more, where the particle size is modulated. When the particles are micronized too much, a transparency like a glaze, an appearance and a coarse feeling of the sugar like a fondant are not obtained. This pastry mixed dispersion is solidified without substantially decreasing the particle size of the solid component other than oil and fat. The solidified shape may be any of a block shape, a plate shape, a dice shape, a pellet shape or a particle shape. Also, it may be packed and solidified in a container such as a spout bag, which is fitted with an extrusion nozzle, or the like.

The method for applying the above-mentioned coating materials on confectionery products or bakery products may be any method that is selected from an enrober method, a line drawing method, a dipping method and the like, which can be operated by the manual work or by employing a machine such as an enrober or the like. The coating conditions comprise melting the coating material for the confectionery/bakery use in a water bath kept at 40 to 50° C., as in the case of an ordinary raw chocolate coating, then lowering the material temperature to about 40° C. and coating the resulting material on frozen deserts, refrigerated confectionaries, cream puffs, doughnuts, breads or the like. When the cream puffs, the doughnuts or the breads, which are thus coated with the coating material, are stored, they do not suffer from the stickiness and the sugar-sagging. Even in the case where the water content of the confectionaries or bakeries exceeds 30%, the coated confectioneries or bakeries are not easy to induce the stickiness and the sugar-sagging during the storage after the coating.

EXAMPLES

The present invention is illustrated in more detail by the following examples, but the examples are not intended to restrict the spirit of the present invention. In the examples, all the percents and parts except SFC are by weight.

When employed in the following Examples and Comparative Examples, a commercially available powdered sugar (manufactured by Kabushiki Kaisha Aritomo Shoten) was used as the powdered sugar, "TREHAOSE" (distributed by Kabushiki Kaisha Hayashibara Shoji) as trehalose, a commercially available instant coffee (manufactured by Nestle Japan Kabushiki Kaisha) as the coffee powder and "GMDF950" (manufactured by DELFI Company) as the cocoa powder. A universal mixer manufactured by Dalton was used as the mixer.

Example 1

Into 60 parts of the powdered sugar (the particle size: 70 to 100 $\mu$m) were mixed uniformly 20 parts of a hardened rapeseed oil (SFC at 20° C.: 49.1%; SFC at 35° C.: 4.6%), which was melted at 50° C., by the use of the mixer to prepare a paste, into which additional 20 parts of the hardened rapeseed oil that was melted at 50° C. as well as appropriate amounts of lecitin and a perfumery were then added to mix, and the resulting mixture was solidified to a block shape by cooling without rolling. The water content thereof was 1.0%. The thus-prepared coating material for the confectionery/bakery use was coated on commercially available, ring doughnuts having the water content of 30% (the weight of each was about 30 g). The coating method comprised dipping the top of each of the ring doughnuts upside down in a bath, in which the coating material was maintained at the material temperature of about 40° C., to coat about 7.5 g of the coating material on the top of each of the ring doughnuts. After the coating material was solidified, each of the coated ring doughnuts was packaged in a sealed bag, and was stored at 10° C. and 20° C. for 1 day and 3 days. The products were examined for the eating feeling, the flavor and the appearance soon after the making, as well as for the conditions after the storage, especially the stickiness onto the package bag. The eating feeling of the product soon after the making was crispy in a manner similar to the case of a glaze, the flavor was good and the appearance had a transparency similar to that of a glaze. Any change was not observed on the products that were stored at 10° C. and 20° C. for 1 day, resulting in a good result. After the storage for 3 days, a good result was obtained on the product stored at 10° C., whereas some stickiness was observed on the bag of the product stored at 20° C.

Comparative Example 1

An investigation was carried out in the same manner as that in Example 1, except that the mixed dispersion was rolled to make particles having a particle size of 20 to 30 μm. The products were examined for the eating feeling, the flavor and the appearance soon after the making, as well as for the conditions after the storage, especially the stickiness onto the package bag. The eating feeling of the product soon after the making was not crispy and it did not have a transparent appearance, unlike a glaze.

Comparative Example 2

Into 82 parts of Glaze Mix D-10 (manufactured by Showa Sangyou Kabushiki Kaisha) were added 18 parts of hot water, and the resulting mixture was mixed until it became uniform to obtain an ordinary glaze. The top of each of the ring doughnuts was dipped upside down in a bath, in which the glaze was maintained at the material temperature of 43° C., to coat about 1.5 g of the glaze on the top of each of the ring doughnuts. After the glaze was solidified, each of the coated ring doughnuts was packaged in a sealed bag, and was stored at 10° C. and 20° C. for 1 day and 3 days. The products were examined for the eating feeling, the flavor and the appearance soon after the making, as well as for the conditions after the storage, especially the stickiness onto the package bag. On the storage at 10° C. and 20° C. for 1 day, the sugar on the products was dissolved and stuck on the bag.

Table 1 shows the results on Example 1, Comparative Example 1 and Comparative Example 2.

TABLE 1

Results on Example 1, Comparative Example 1 and Comparative Example 2

|  | Example 1 | Comparative Example 1 | Comparative Example 2 |
| --- | --- | --- | --- |
| Soon after making |  |  |  |
| Eating feeling | Had crispiness like glaze | Had not crispiness like glaze | Had crispiness like glaze |
| Flavor | Good | Good | Good |
| Appearance | Transparency obtained | Transparency not obtained | Transparency obtained |
| Storage |  |  |  |
| At 10° C. for 1 day |  |  |  |
| Stickiness on package bag At 20° C. for 1 day | Not stuck on bag | Not stuck on bag | Sugar dissolved to be stuck on bag |
| Stickiness on package bag At 10° C. for 3 days | Not stuck on bag | Not stuck on bag | Sugar dissolved to be stuck on bag |
| Stickiness on package bag At 20° C. for 3 day | Not stuck on bag | Not stuck on bag | Sugar dissolved to be stuck on bag |
| Stickiness on package bag | Somewhat stuck on bag | Somewhat stuck on bag | Sugar dissolved to be stuck on bag |

Example 2

Into 60 parts of the powdered sugar (the particle size: 70 to 100 μm) were mixed uniformly 16 parts of a hardened palm kernel oil (SFC at 20° C.: 78.6%; SFC at 35° C.: 3.8%) and 4 parts of a low melting palm oil (the iodine value: 65), which were melted at 50° C., by the use of the mixer to prepare a paste, into which additional 20 parts of the hardened palm kernel oil that was melted at 50° C. as well as appropriate amounts of lecitin and a perfumery were then added to mix, and the resulting mixture was solidified to a block shape without rolling. The water content thereof was 1.0%. As for the content of the solid fat in the oil and fat component in the thus-obtained coating material, SFC at 20° C. was 72.3%, and SFC at 35° C. was 4.1%. The thus-prepared coating material for the confectionery/bakery use was coated on commercially available, ring doughnuts having the water content of 30% (the weight of each was about 30 g). The coating method comprised dipping the top of each of the ring doughnuts upside down in a bath, in which the coating material was melted in a water bath kept at 40 to 50° C. and maintained at the material temperature of about 40° C., to coat about 6.5 g of the coating material on the top of each of the ring doughnuts. After the coating material was solidified, each of the coated ring doughnuts was packaged in a sealed bag, and was stored at 10° C. and 20° C. for 3 days. The products were examined for the eating feeling, the flavor and the appearance soon after the making, as well as for the conditions after the storage, especially the stickiness onto the package bag. The eating feeling of the product soon after the making was crispy in a manner similar to the case of a glaze, the flavor was good and the appearance had a transparency similar to that of a glaze. Any change was not observed on the products that were stored at 10° C. and 20°

C. for 1 day, resulting in a good result. After the storage for 3 days, a good result was obtained on the product stored at 10° C., whereas a slight stickiness was observed on the bag of the product stored at 20° C.

Example 3

Into 60 parts of trehalose (the particle size: 110 to 140 μm) were mixed uniformly 16 parts of a hardened palm kernel oil (SFC at 20° C.: 78.6%; SFC at 35° C.: 3.8%) and 4 parts of a low melting palm oil (the iodine value: 65), which were melted at 50° C., by the use of the mixer to prepare a paste, into which additional 20 parts of the hardened palm kernel oil that was melted at 50° C. as well as appropriate amounts of lecitin and a perfumery were then added to mix, and the resulting mixture was solidified to a block shape without rolling. The water content thereof was 1.0%. As for the content of the solid fat in the oil and fat component in the thus-obtained coating material, SFC at 20° C. was 72.3%, and SFC at 35° C. was 4.1%. The thus-prepared coating material for the confectionery/bakery use was coated on commercially available, ring doughnuts having the water content of 30% (the weight of each was about 30 g). The coating method comprised dipping the top of each of the ring doughnuts upside down in a bath, in which the coating material was melted in a water bath kept at 40 to 50° C. and maintained at the material temperature of about 40° C., to coat about 6.5 g of the coating material on the top of each of the ring doughnuts. After the coating material was solidified, each of the coated ring doughnuts was packaged in a sealed bag, and was stored at 10° C. and 20° C. for 3 days. The products were examined for the eating feeling, the flavor and the appearance soon after the making, as well as for the conditions after the storage, especially the stickiness onto the package bag. The eating feeling of the product soon after the making was crispy in a manner similar to the case of a glaze, the flavor was good and the appearance had a transparency similar to that of a glaze. Any change was not observed on the products that were stored at 10° C. and 20° C. for 1 day and 3 days, resulting in a good result.

Example 4

Into 60 parts of the powdered sugar (the particle size: 70 to 100 μm), 3 parts of the coffee powder and 1 part of the cocoa powder were mixed uniformly 20 parts of a hardened palm kernel oil (SFC at 20° C.: 78.6%; SFC at 35° C.: 3.8%), which was melted at 50° C., by the use of the mixer to prepare a paste, into which additional 20 parts of the hardened palm kernel oil that was melted at 50° C. as well as appropriate amounts of lecitin and a perfumery were then added to mix, and the resulting mixture was packed to solidify in a spout bag container, which was fitted with an extrusion nozzle, without rolling. The spout bag container was soaked in a water bath kept at 40 to 50° C. to melt the coating material inside, which was lineally drawn on roll breads (the water content: 30%). After the coating material was solidified, each of the roll breads was packaged in a sealed bag, and was stored at 10° C. and 20° C. for 1 day and 3 days. The products were examined for the eating feeling, the flavor and the appearance soon after the making, as well as for a change in the conditions after the storage. The eating feeling of the product soon after the making was crispy in a manner similar to the case of a fondant of the coffee type, the flavor was good and the appearance had a transparency similar to that of a fondant of the coffee type. Any change was not observed on the products that were stored at 10° C. and 20° C. for 1 day, resulting in a good result. After the storage for 3 days, a good result was obtained on the product stored at 10° C., whereas a slight stickiness was observed on the bag of the product stored at 20° C.

Example 5

Into 60 parts of the powdered sugar (the particle size: 70 to 100 μm), 5 parts of a cacao mass and 15 parts of the cocoa powder were mixed uniformly 20 parts of a hardened palm kernel oil (SFC at 20° C.: 78.6%; SFC at 35° C.: 3.8%), which was melted at 50° C., by the use of the mixer to prepare a paste, into which additional 20 parts of the hardened palm kernel oil that was melted at 50° C. as well as appropriate amounts of lecitin and a perfumery were then added to mix, and the resulting mixture was solidified to a block shape without rolling (the oil component: 44.4%). The thus-prepared coating material for the confectionery/bakery use was coated on commercially available, cream puffs (for each, the diameter: about 80 mm; the height: 45 mm; the weight: 67 to 70 g; a custard having the water content of about 60% was contained inside as a filling material). The coating method comprised dipping the top of each of the cream puffs upside down in a bath, in which the coating material was melted in a water bath kept at 40 to 50° C. and maintained at the material temperature of about 40° C., to coat about 8 g of the coating material on the top of each of the cream puffs. After the coating material was solidified, each of the coated cream puffs was packaged in a sealed bag, and was stored at 10° C. and 20° C. for 1 day and 3 days. The products were examined for the eating feeling, the flavor and the appearance soon after the making, as well as for the conditions after the storage, especially the stickiness onto the package bag. The eating feeling of the product soon after the making was crispy in a manner similar to the case of a chocolate fondant, the flavor was good and the appearance had a transparency similar to that of a chocolate fondant. Any change was not observed on both products that were stored at 10° C. and 20° C. for 1 day, resulting in a good result. After the storage for 3 days, a good result was obtained on the product stored at 10° C., whereas a slight stickiness was observed on the bag of the product stored at 20° C.

Table 2 shows the results on Example 2 to Example 5.

TABLE 2

| Results on Example 2 to Example 5 | | |
| --- | --- | --- |
| | Example 2 | Example 3 |
| Soon after making | | |
| Eating feeling | Had crispiness like glaze | Had crispiness like glaze |
| Flavor | Good | Good |
| Appearance | Transparency obtained | Transparency obtained |
| Storage | | |
| At 10° C. for 1 day | | |
| Stickiness on package bag | Not stuck on bag | Not stuck on bag |
| At 20° C. for 1 day | | |
| Stickiness on package bag | Not stuck on bag | Not stuck on bag |
| At 10° C. for 3 days | | |
| Stickiness on package bag | Not stuck on bag | Not stuck on bag |

TABLE 2-continued

Results on Example 2 to Example 5

At 20° C. for 3 day

| | | |
|---|---|---|
| Stickiness on package bag | Slightly stuck on bag | Not stuck on bag |
| | Example 4 | Example 5 |
| Soon after making | | |
| Eating feeling | Had crispiness like coffee-type fondant | Had crispiness like chocolate fondant |
| Flavor | Good | Good |
| Appearance | Appearance like coffee-type fondant | Appearance like chocolate fondant |
| Storage | | |
| At 10° C. for 1 day | | |
| Stickiness on package bag | Not stuck on bag | Not stuck on bag |
| At 20° C. for 1 day | | |
| Stickiness on package bag | Not stuck on bag | Not stuck on bag |
| At 10° C. for 3 days | | |
| Stickiness on package bag | Not stuck on bag | Not stuck on bag |
| At 20° C. for 3 day | | |
| Stickiness on package bag | Slightly stuck on bag | Slightly stuck on bag |

Comparative Example 3

Into 80 parts of the powdered sugar (the particle size: 70 to 100 μm) were mixed uniformly 20 parts of a hardened rapeseed oil (SFC at 20° C.: 49.1%; SFC at 35° C.: 4.6%), which was melted at 50° C., by the use of the mixer to prepare a paste, into which appropriate amounts of lecitin and a perfumery were then added to mix, and the resulting mixture was solidified to a block shape without rolling. In order to coat the thus-prepared coating material for the confectionery/bakery use on commercially available, ring doughnuts (the weight of each was about 30 g), the coating material was melted in a water bath kept at 40 to 50° C., but it did not become fluid, thereby being not able to dip the ring doughnuts.

Comparative Example 4

Into 20 parts of the powdered sugar (the particle size: 70 to 100 μm) were mixed uniformly 30 parts of a hardened rapeseed oil (SFC at 20° C.: 49.1%; SFC at 35° C.: 4.6%), which was melted at 50° C., by the use of the mixer to prepare a paste, into which additional 50 parts of the hardened rapeseed oil that was melted at 50° C. as well as appropriate amounts of lecitin and a perfumery were then added to mix, and the resulting mixture was solidified to a block shape without rolling. The thus-prepared coating material for the confectionery/bakery use was coated on commercially available, ring doughnuts (the weight of each was about 30 g). The coating method comprised dipping the top of each of the ring doughnuts upside down in a bath, in which the coating material was melted in a water bath kept at 40 to 50° C. and maintained at the material temperature of about 40° C., to coat about 7.5 g of the coating material on the top of each of the ring doughnuts. As for the eating feeling and the flavor of the products after the coating material was solidified, the sweetness was low and the crispiness was missing, unlike a glaze.

Example 6

Into 40 parts of trehalose (the particle size: 110 to 140 μm) were mixed uniformly 30 parts of a hardened palm kernel oil, which was melted at 50° C., by the use of the mixer to prepare a paste, into which 30 parts of soybean oil as well as appropriate amounts of lecitin, a perfumery and a food color were then added to mix, and the resulting mixture was solidified to a block shape without rolling. The water content thereof was 1.0%. As for the content of the solid fat in the oil and fat component in the thus-obtained coating material, SFC at 20° C. was 15.2%, and SFC at 35° C. was 0%. The thus-prepared coating material for the frozen desert use was coated on commercially available, ice cream bars. The coating method comprised dipping the top of each of the ice cream bars upside down in a bath, in which the coating material was melted in a water bath kept at 40 to 50° C. and maintained at the material temperature of about 40° C., to coat about 9 g of the coating material on the top of each of the ice cream bars. The coating part was transparent, whereby there was yielded a transparent coating material through which the inside ice cream could be transparently seen.

INDUSTRIAL APPLICABILITY

As described hereinabove, according to the present invention, the appearance and the eating feeling could be made analogous to those of a glaze and a fondant, and in addition, the sticky property, which had been heretofore generated with the passage of time after the coating, could be significantly improved.

What is claimed:

1. A coating material for confectionery/bakery use comprising as main components an oil and fat and a sugar, which contains coarse particles of a solid component other than the oil and fat having a particle size of 50 μm or more, wherein the content of a solid fat in said oil and fat is 45% or more at 20° C. and 15% or less at 35° C., said sugar has a particle size of 70 μm to about 1 mm, said coating material is transparent, the water content is 5% by weight or less based on the total weight of the coating material, the amount of the sugar is 25 to 75% by weight based on the coating material, and the amount of the oil and fat is 25% by weight or more based on the coating material.

2. The coating material for the confectionery/bakery use according to claim 1, wherein the amount of a component having a particle size of 50 μm or less in the solid component other than the oil and fat is 20% by weight or less based on the solid component other than the oil and fat.

3. The coating material for the confectionery/bakery use according to claim 2, which contains, in the oil and fat, 70% or more of a laurin oil and fat and 20% or less of a total of SU2 and U3, whose content of a solid fat is 75 to 90% at 10° C., 70 to 85% at 20° C. and 15 to 35% at 30° C.

4. The coating material for the confectionery/bakery use according to claim 2, wherein the amount of the oil and fat is 25 to 75% by weight based on the coating material for the confectionery/bakery use.

5. A process for producing a coated confectionery or bakery product, which comprises heating the coating material for the confectionery/bakery use according to claim 2 to above a temperature at which the oil and fat melt, coating the resulting material on a confectionery or bakery product and then solidifying the oil and fat component.

6. The coating material for the confectionery/bakery use according to claim 1, which contains, in the oil and fat, 70% or more of a laurin oil and fat and 20% or less of a total of SU2 and U3, whose content of a solid fat is 75 to 90% at 10° C., 70 to 85% at 20° C. and 15 to 35% at 30° C.

7. The coating material for the confectionery/bakery use according to claim 6, wherein the amount of the oil and fat is 25 to 75% by weight based on the coating material for the confectionery/bakery use.

8. A process for producing a coated confectionery or bakery product, which comprises heating the coating material for the confectionery/bakery use according to claim 6 to above a temperature at which the oil and fat melt, coating the resulting material on a confectionery or bakery product and then solidifying the oil and fat component.

9. The coating material for the confectionery/bakery use according to claim 1, wherein the amount of the oil and fat is 25 to 75% by weight based on the coating material for the confectionery/bakery use.

10. A process for producing a coated confectionery or bakery product, which comprises heating the coating material for the confectionery/bakery use according to claim 9 to above a temperature at which the oil and fat melt, coating the resulting material on a confectionery or bakery product and then solidifying the oil and fat component.

11. A process for producing the coating material for the confectionery/bakery use according to claim 1, which comprises heating raw materials comprising as main components the oil and fat and the sugar, which contain coarse particles of a solid component other than the oil and fat having a particle size of 50 $\mu$m or more, to above a temperature at which the oil and fat melt, and then solidifying the resulting mixture without substantial decrease of the particle size of the solid component other than oil and fat.

12. A process for producing a coated confectionery or bakery product, which comprises heating the coating material for the confectionery/bakery use according to claim 1 to above a temperature at which the oil and fat melt, coating the resulting material on a confectionery or bakery product and then solidifying the oil and fat component.

13. The process for producing a coated confectionery or bakery product according claim 12, wherein the confectionery product is frozen deserts or refrigerated confectioneries, or the bakery product is cream puffs, doughnuts or breads.

* * * * *